United States Patent
Li et al.

(10) Patent No.: US 9,134,122 B2
(45) Date of Patent: Sep. 15, 2015

(54) APPARATUS FOR DETECTING THE FLATNESS OF WAFER AND THE METHOD THEREOF

(71) Applicant: Shanghai Huali Microelectronics Corporation, Shanghai (CN)

(72) Inventors: WenLiang Li, Shanghai (CN); LiJun Chen, Shanghai (CN); Jun Zhu, Shanghai (CN); HsuSheng Chang, Shanghai (CN)

(73) Assignee: Shanghai Huali Microelectronics Corporation, Shanghai (CN)

( * ) Notice: Subject to any disclaimer, the term of this patent is extended or adjusted under 35 U.S.C. 154(b) by 160 days.

(21) Appl. No.: 14/092,056

(22) Filed: Nov. 27, 2013

(65) Prior Publication Data

US 2014/0153000 A1      Jun. 5, 2014

(51) Int. Cl.
| | |
|---|---|
| *G01B 11/30* | (2006.01) |
| *B24B 1/00* | (2006.01) |
| *B24B 5/00* | (2006.01) |
| *B24B 37/30* | (2012.01) |
| *B24B 37/10* | (2012.01) |
| *B24B 37/04* | (2012.01) |

(52) U.S. Cl.
CPC ............ *G01B 11/306* (2013.01); *B24B 37/042* (2013.01); *B24B 37/105* (2013.01); *B24B 37/30* (2013.01); *G01B 11/303* (2013.01)

(58) Field of Classification Search
CPC .... G01B 11/306; G01B 11/303; B24B 37/30; B24B 37/042; B24B 37/105

USPC ...................... 356/600; 451/41, 288
See application file for complete search history.

(56) References Cited

U.S. PATENT DOCUMENTS

| | | | |
|---|---|---|---|
| 6,425,801 B1 * | 7/2002 | Takeishi et al. .................. 451/5 |
| 2014/0199788 A1 * | 7/2014 | Vermont et al. .................. 438/5 |
| 2014/0330422 A1 * | 11/2014 | Ranish ......................... 700/121 |

FOREIGN PATENT DOCUMENTS

| | | |
|---|---|---|
| CN | 101276151 A | 10/2008 |
| CN | 101957186 A | 1/2011 |

* cited by examiner

*Primary Examiner* — Tarifur Chowdhury
*Assistant Examiner* — Sunghee Y Gray
(74) *Attorney, Agent, or Firm* — Myron Greenspan; Lackenbach Siegel LLP

(57) ABSTRACT

An apparatus for detecting the flatness of a top surface of a wafer includes a plurality of detector elements, a metal sink and a plurality of injection pipes. Each detector element comprises: a metal tube body, jet pipes, a light receiver and a light emitter. The method comprises: injecting ultra-pure water into the detector elements by injection pipes; emitting parallel beams along an upward-oblique direction, a preset Angle θ being formed between the beams and the vertical direction. The radiated beams above the water surface are incident on a receiver. The intensity of the beams received by the light receiver is used to calculate the height of the detecting point of the surface of the silicon wafer to determine the flatness condition of the wafer surface. The flatness of the photo-resist covered on the wafer surface can also be accurately measured by this method.

10 Claims, 5 Drawing Sheets

APPARATUS FOR DETECTING THE FLATNESS OF WAFER AND THE METHOD THEREOF

CROSS-REFERENCE TO RELATED APPLICATIONS

The present application claims priority under the Paris Convention to Chinese application number CN 201210501282.4, filed on Nov. 30, 2012, the disclosure of which is herewith incorporated by reference in its entirety.

BACKGROUND OF THE INVENTION

1. Field of the Invention

The present invention relates to the field of microelectronics, in particular it relates to an apparatus for detecting flatness of a top surface of a wafer and the detecting method thereof.

2. Description of the Prior Art

In the production process of integrated circuits, the surface of the silicon wafer is usually not perfectly flat but is undulating. If the undulating surface is ignored, it will cause partial regions of the exposed areas to be out of focus in the exposure process of traditional photolithography so that the image of the pattern will be affected.

The detection for wafer flatness by a scanner is an important measurement step prior to the exposure of the wafer. Because of this measurement step, the scanner will expose the film such as photo-resist covered on the wafer under the optimal exposure conditions corresponding to the surface of the wafer. The surface with the smallest overall differences in surface irregularities becomes the best focused plane at the various points from the exposure area and is called the best focused surface.

Currently, there are two methods in the present industry for detecting the flatness of a wafer by a scanner, 1. The optical method: emitting light onto the surface of the wafer, then the light is reflected by the surface of the wafer and the reflected light is received by a sensor. The intensity of the reflected light is determined by the sensor, and the height of the point calculated. A row of equally spaced groups of light transmitters and light receivers are arranged parallel in the lateral direction, then the wafer is scanned in the longitudinal direction. As a result, the height of every point on the wafer can be obtained, which is used for determining the flatness of the entire wafer.

In the process of this method, since the emitted light will penetrate the photoresist so that what the method measures is the flatness of the substrate. During the process of coating the photoresist, the photoresist flows before it is heated and dried, thus there are some differences between the flatness of the substrate and the flatness of the photoresist. However what we actually want to measure is the flatness of the photoresist surface. Therefore, the flatness measured by this method is somehow different from the actual desired flatness.

2. The (Air Gauge) method: This method combines the optical method and air method. Firstly, the optical method is applied to measure the height of each point on the wafer surface in the exposed area. Then air is sprayed on a point within the exposed area on the surface of the wafer. A sensor receives the air rebounding from the surface of the wafer. According to the different flow rates of the air received by the sensor, the height of the point is calculated. Then the different points within the exposed area are detected to determine the height of every point in the exposed area. The difference of every point which is detected between the air measurement and the optical measurement will be calculated. As the substrate height is different at various points within the exposed area, the difference values of these points will not the same. A model is built based on these difference values, which is recorded in the scanner. In the future actual production, the optical detection method is firstly used to measure the flatness of the wafer, then this model is called and the difference value is added point-to-point, the result will be equivalent to the flatness measured by air.

As using the air method for measurement is relatively slow and the flows will affects each other if a row of such air jets and sensors are arranged, the air method will not work alone and the optical method has to be combined to detect the flatness. If the combined method is used to detect the different substrates, different models need to be established according to the difference values between the measured results in air flow approach and the measured results using the optical method for each product each layer. Therefore, the model establishment used in production will result in a relatively large workload. Once the substrate changes, the flatness measured by this method will not be accurate and the data will need to be collected again to build a new model. In practical production, because of the shift in the etching or polishing process, measurements inaccuracies will result.

Chinese patent (CN 101276151A) discloses a method and device for measuring the smoothness of a wafer surface. The morphology values of the different positions of the wafer surface are measured by the redundancy of the vertical location device of the work piece stage in an exposure device. The smoothness at any point on the wafer surface is acquired through the polynomial fitting calculation. The technical solution described in the literature has not solved the problem of the inaccuracy in measurement caused by the bias in the etching or polishing process.

Chinese patent (CN 101957186A) describes a method for detecting the flatness of the wafer surface. A light that is parallel to the surface of the wafer is used to irradiate outside, and the wafer surface flatness is detected according to the direction of the beam received by the light receiver.

SUMMARY OF THE INVENTION

In order to overcome the defects in the prior art, the present invention provides an apparatus for detecting the flatness of a wafer and method therefor, the details being introduced in the following text.

An apparatus for detecting the flatness of a wafer is provided and comprises a plurality of spaced detector elements, a metal sink and a plurality of injection pipes. The detector elements are all arranged side by side and arranged in parallel to each other together making up one-row of detector elements. There is a preset distance between each two adjacent detector elements. Each of the detector elements is fixed on the metal sink, and the upside of each of detector elements is provided with one of the corresponding injection pipes so that an injection pipe can inject liquid into the inside of the tubular detector element underlying this injection pipe. Each of the detector elements is used for detecting the height of a corresponding detection point on the wafer. Each detector element comprises a metal tube body, the lower peripheral portion of the metal tube body being arranged with an array of jet pipes. The jet pipes are used to spray XCDA (extreme clean dry air) downward and the sprayed air around the liquid portion flowing the bottom opening of the metal tube body is used to encapsulate the liquid portion below the metal tube body. A light emitter is disposed on one side wall inside the metal tube body. A light receiver is disposed on the other side wall opposite to the side wall having a light emitter and the light receiver is located higher than the light emitter.

The shape of the cross section of the metal tube body of the apparatus may be square, rectangular or circular and the shape of the cross section of the jet pipe may be square, rectangular or circular.

According to the above apparatus, the light emitter emits parallel beams along an upward-oblique direction, an preset Angle θ being formed between the parallel beams and the vertical direction. The position and size of the light receiver are set to receive all the parallel beams emitted from the light emitter completely when there is no liquid inside the detector elements.

According to the above apparatus, the Angle θ satisfies the following relationship:

$$\sin \theta > N_1/N_2$$

wherein, sin θ is the sine value of the Angle θ, N1 is the refractive index of the parallel beams in the air, N2 is the refractive index of the parallel beams in the liquid.

The present invention further provides a method for the above apparatus, which is applied in a scanner or lithography machine for detecting the flatness of the wafer, ultra-pure water is used as the liquid inside the detector elements, wherein the above apparatus for detecting the flatness of the wafer is applied. The apparatus is fixed on the scanner. The method comprises the following steps:

Step A, ultra-pure water is injected into in the detector element by the injection pipes, the amount of the injected ultra-pure water is preset and fixed when the detection is conducted by the same detector element each time. The jet pipes keep spraying ultra-clean air downward to prevent the ultra-pure water overflow from the lower portion of the metal tube body;

Step B, parallel beams are emitted by the light emitter along an upward-oblique direction, a preset Angle θ being formed between the parallel beams and the vertical direction, the light receiver completely receives the all parallel beams above the liquid surface;

Step C, according to the intensity of the parallel beams received from the light receiver, the height of each detected point on the wafer which is corresponding to the detector elements is calculated by a preset method;

Step D, all the heights detected by the detector elements are integrated so that the height of each point on the entire wafer is obtained. Thus, the flatness of the entire wafers is finally established.

According to the above method, in Step A, the preset value denotes the amount of water which can lead the top surface of the ultra-pure water to locate in a place that is close to the center of the vertical direction of the light emitter.

According to the above method, in Step C, the preset method comprises:

Step 1, a testing wafer which can be defined as a benchmark wafer is placed on the wafer stage of the scanner; the testing wafer is a new ultra-flat silicon wafer without being deposited with any film stack. When the horizontal position of the wafer state is fixed and kept unchanged, the wafer stage together with the ultra-flat silicon wafer is moved in the vertical direction;

Step 2, the intensity of the light received by the light receiver of every detector element corresponding to every point on the wafer with different heights is detected; and a function relationship is established between the height of each point of the wafer and the intensity of the corresponding light. The function relationship is saved in the scanner as a specific relational model of the scanner;

Step 3, in Step C, according to the intensities of the parallel beams received from the light receiver, the heights of the detecting points of the wafer that correspond to the detector elements are calculated by the relational model described in Step 2.

According to the above method, the relational model is saved in each scanner.

The advantages of these technical solutions are: compared with the optical method, the flatness of the photo-resist on the wafer surface can be accurately measured by this method and compared with the AGILE (Air Gauge) method, no need to create a model for each product each layer, no so large workload, etch and polish process shift will not induce effect.

DETAILED DESCRIPTION OF THE PREFERRED EMBODIMENT

The present invention will be further illustrated in combination with the following embodiments as well as the figures. However, the embodiments and figures should not be taken as the limitation of the invention.

Figure 1:
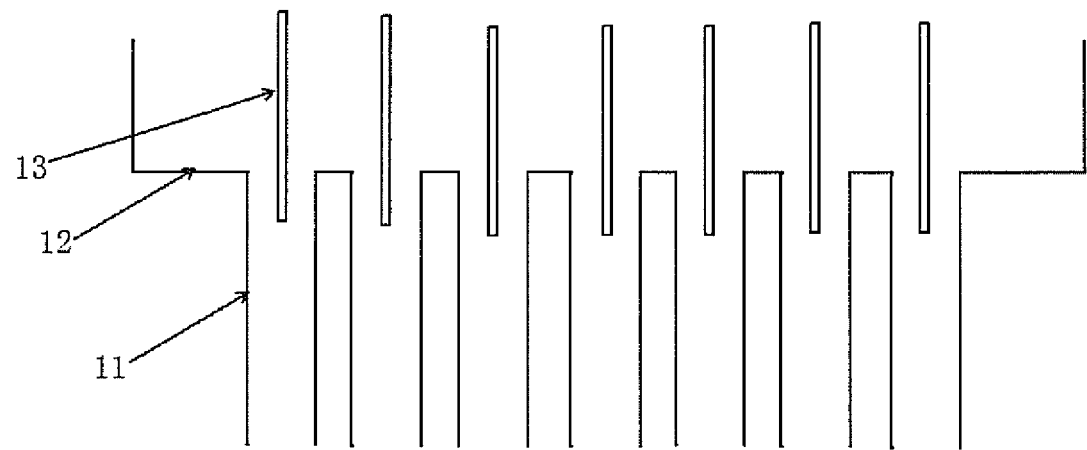
FIG. 1 is a cross-sectional schematic view of the apparatus for detecting the flatness of a wafer, which is mounted on a scanner in an embodiment of the present invention.

As shown in FIG. 1, an apparatus for detecting the flatness of a surface of wafer in an embodiment of the invention comprises: a plurality of detector elements 11 arranged side by side together malting up one-row of detector elements, wherein the distance between adjacent detector elements 11 is equal. The apparatus also comprises a metal sink 12 and a plurality of injection pipes 13 arranged side by side, the injection pipes 13 matching with each of the detector elements 11 separately. The upside of each of detector elements 11 is provided with one of the injection pipes 13. Each of the detector elements 11 is fixed on a corresponding metal sink 12 and communicates with a corresponding metal sink 12. Each of the injection pipes 13 is located above a corresponding one of the detector elements 11 so that the injection pipe 13 is used for injecting a liquid for detection into the bottom portion of the tubular detector element 11. The heights of the detector element 11 can be controlled by an interferometer (not shown), the interferometer device being known to one of the ordinary skill in the art and will not be described here.

Figure 2:
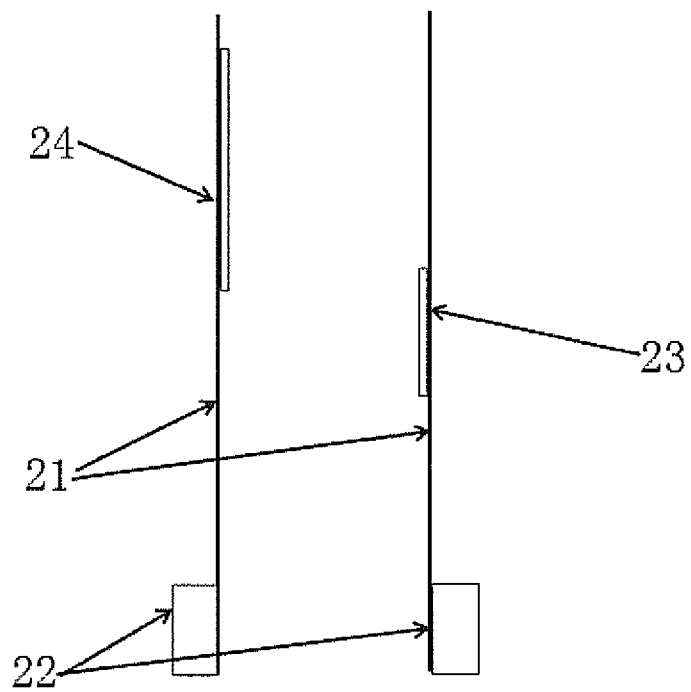
FIG. 2 is a sectional structure view of a detector element according to an embodiment of the present invention.

As shown in FIG. 2, each detector element comprises a metal tube body 21. The cross section of the metal tube body 21 may be square, rectangular or circular. The lower peripheral portion of the metal tube body 21 are provided with an array of jet pipes 22, the jet pipes 22 being used to spray XCDA (extreme clean dry air) downward in order to prevent fluid from overflowing from the metal tube body 21, because there is a small gap between the bottom opening of the detector element 11 and the top surface of the wafer to prevent the detector element 11 scratching the wafer, and the liquid portion flowing from the bottom opening of the metal tube body 21 which is between the bottom opening of the metal tube body 21 and the top surface of the wafer will be sealed by the sprayed air region. In some embodiments. The cross section of the jet pipes 22 may be square, rectangular or circular. A light emitter 23 is disposed on a side wall in the metal tube body 21, and a light receiver 24 is disposed on the other side wall in the metal tube body 21 opposite to the wall with the light emitter 23.

Figure 3:
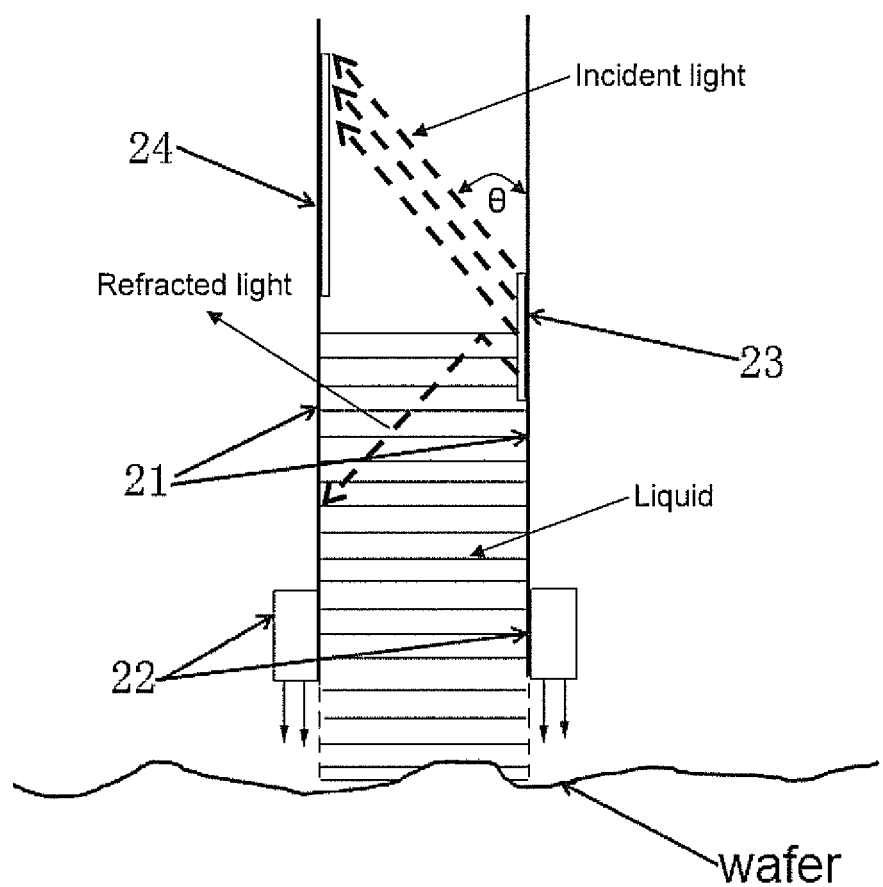
FIG. 3 is an enlarged schematic diagram of the detector element shown in FIG. 2 in use according to an embodiment of the present invention.

FIG. 3 shows a schematic diagram for the operation of the detector elements. A wafer set below the detector elements, liquid is filled in the bottom portion of the tubular detector element and there is a small gap between the bottom end of the detector element and the top surface of the wafer, wherein the light emitter 23 can radiate parallel beams or light rays along an upward-oblique direction. FIG. 3 illustrates a preset Angle θ formed between the parallel beam and the vertical direction, and the Angle θ satisfies the following relationship: Sin θ>$N_1/N_2$ (sin θ is the sine value of the Angle θ, $N_1$ is the refractive index of the parallel beams in the air, $N_2$ is the refractive index of parallel beams in the liquid). In an alternative embodiment, the angle θ includes but is not limited to the range of 49 degrees to 90 degrees. One portion of the parallel light beams that are located below the liquid surface will be totally reflected. However the other portion of the parallel light beams that is located above the liquid surface will be received by the light receiver 24. FIG. 3 shows that the incident light emitted by light emitter 23 that is exposed out of the liquid surface will be incident on the light receiver 24, and other refracted light below the liquid surface emitted by light emitter 23 will be reflected by the liquid surface. In one embodiment, a lower portion of the light emitter 23 is immersed in the liquid and a high portion of the light emitter 23 is exposed above the liquid, about a half of the light emitter 23 being exposed out of the liquid surface and another half of the light emitter 23 is immersed in the liquid (Horizontal lines inside the metal tube body 24). In an embodiment, the emitted light should be red or green or yellow light or other light that would not affect the chemical properties of the photo-resist covered on the upper surface of the wafer, and the wavelength of the beams emitted by light emitter 23 is greater than a desired predetermined value, for example, including but not limited to 530 nm.

In an embodiment, the position and size of the light receiver 24 are arranged to completely receive all the parallel beams emitted from the light emitter 23 when there is no liquid inside the detector elements. As the irregular or undulating surface of the wafer causes the height of water vary in different detector elements so that the intensities of light that the receiver 24 receives are also different. Based on the intensity of the light, the height at any point of the wafer can be calculated. Because there is a row of side-by-side equal spaced detector elements arranged in the transverse direction, the entire wafer surface will be scanned when the one-row detector elements 11 arranged in parallel scan along the longitudinal direction and the height of every point on the wafer can be obtained so that the flatness of the silicon wafer can be detected or determined.

Figure 4:
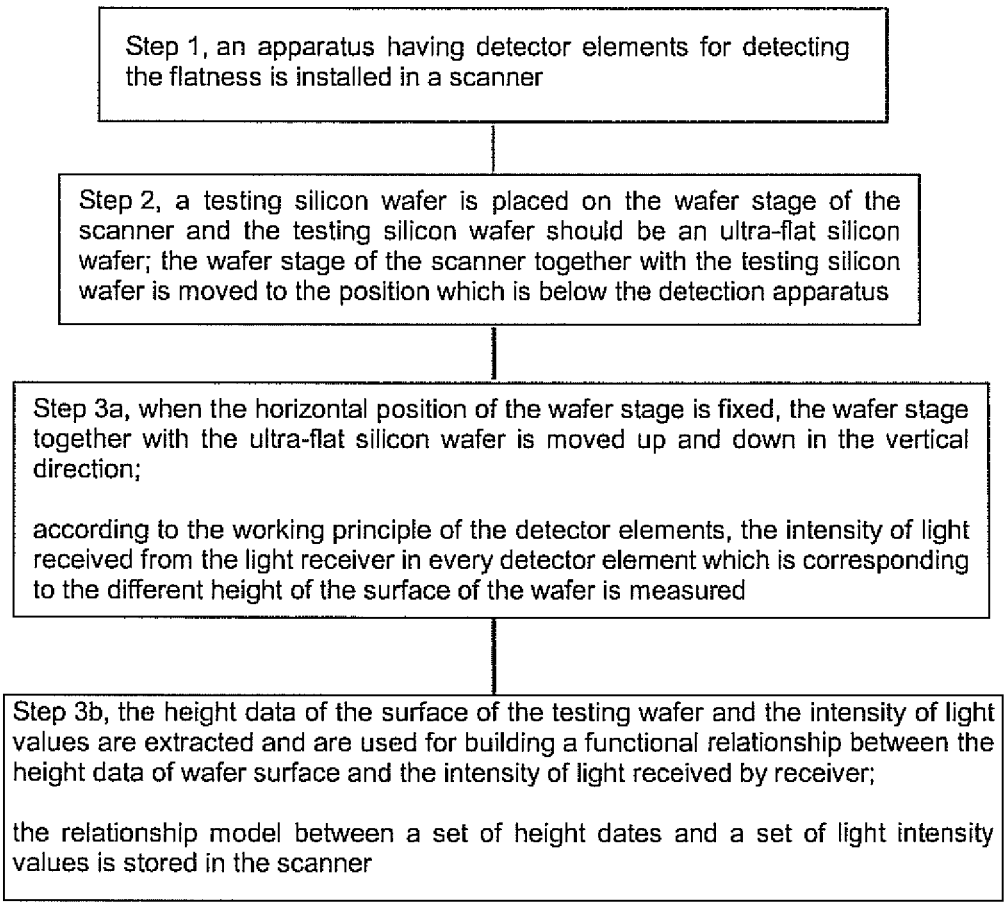
FIG. 4 is a flow chart for establishing the functional relationship between the height of the silicon and the intensity of the light according to an embodiment of the present invention.

The present invention further provides a method for detecting the flatness of a wafer, wherein the scanner is applied for detecting the flatness of the wafer. The ultra-pure water is used as the liquid inside the detector elements. The scanner contains the detection apparatus shown in FIG. 1-3. Before the flatness of the wafer is detected, the relationship between the intensity of the light which is received by the light receivers in every detector element and the height of the surface of wafer should be firstly calibrated during the process of maintaining of the scanner or the process of assembling the scanner. The relationship of the functional formula is established between the height of a silicon wafer and the corresponding light intensity; the functional formulas are saved in the scanner as a specific relational model of the scanner. The specific steps are shown in FIG. 4 and further introduced as follows:

Step 1, an apparatus for detecting the flatness of a wafer is installed in the scanner;

Step 2, a new ultra-flat silicon wafer used for testing is placed on the wafer stage of the scanner;

Step 3a, the wafer stage is moved so as to position the silicon wafer for testing beneath the flatness detection apparatus; and the wafer stage of the scanner together with the testing silicon wafer is moved to a position which is below the detection apparatus;

when the horizontal position of the wafer stage is fixed and kept unchanged, the wafer stage together with the ultra-flat silicon wafer is moved up and down in the vertical direction. According to the above working principle of the detector elements, the intensity of light received from the light receiver in detector element that corresponds to a different height of the surface on the ultra-flat silicon wafer is measured. The location and height of the wafer stage are controlled by the interferometer in the scanner, and the height of the wafer stage represents the relative height of the wafer;

Along with this, the vertical moving amplitude of the stage is small;

Step 3b, the height data of the top surface of the testing wafer and the intensity of light values are extracted via measurement, according to the above height and light intensity values, a functional relationship model based on the wafer height and light intensity is established and is stored in the scanner;

Another wafer that needs to be detected is positioned on the wafer platform or stage of the scanner and the flatness condition of another wafer will be scanned by the detector elements, the intensity of light received by receiver from the another wafer is also measured, and the height data of another wafer can be found out from the relationship model when the intensity of light is known.

Figure 5:
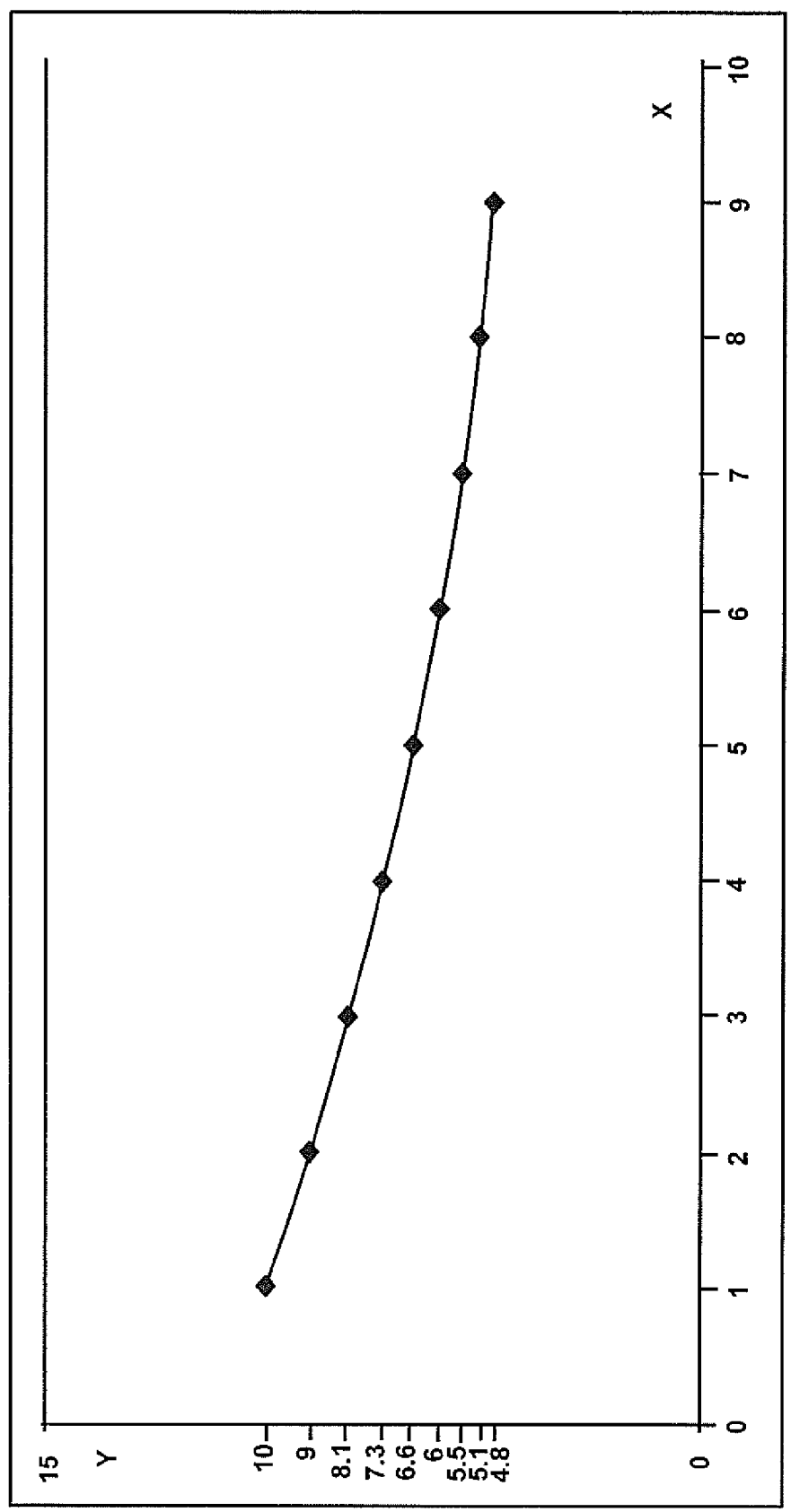
FIG. 5 is a graph or plot of the functional relationship between the height of the silicon and the intensity of the light received by a light receiver according to an embodiment of the present invention.

FIG. 5 is a schematic diagram of the function relationship between the height of the wafer and the light intensity received from light receiver according to an embodiment of the present invention. FIG. 5 is made based on the data shown in the following table:

| X-axis light intensity | Y-axis height |
| --- | --- |
| 1 | 10 |
| 2 | 9 |
| 3 | 8.1 |
| 4 | 7.3 |
| 5 | 6.6 |
| 6 | 6 |
| 7 | 5.5 |
| 8 | 5.1 |
| 9 | 4.8 |

Figure 6:
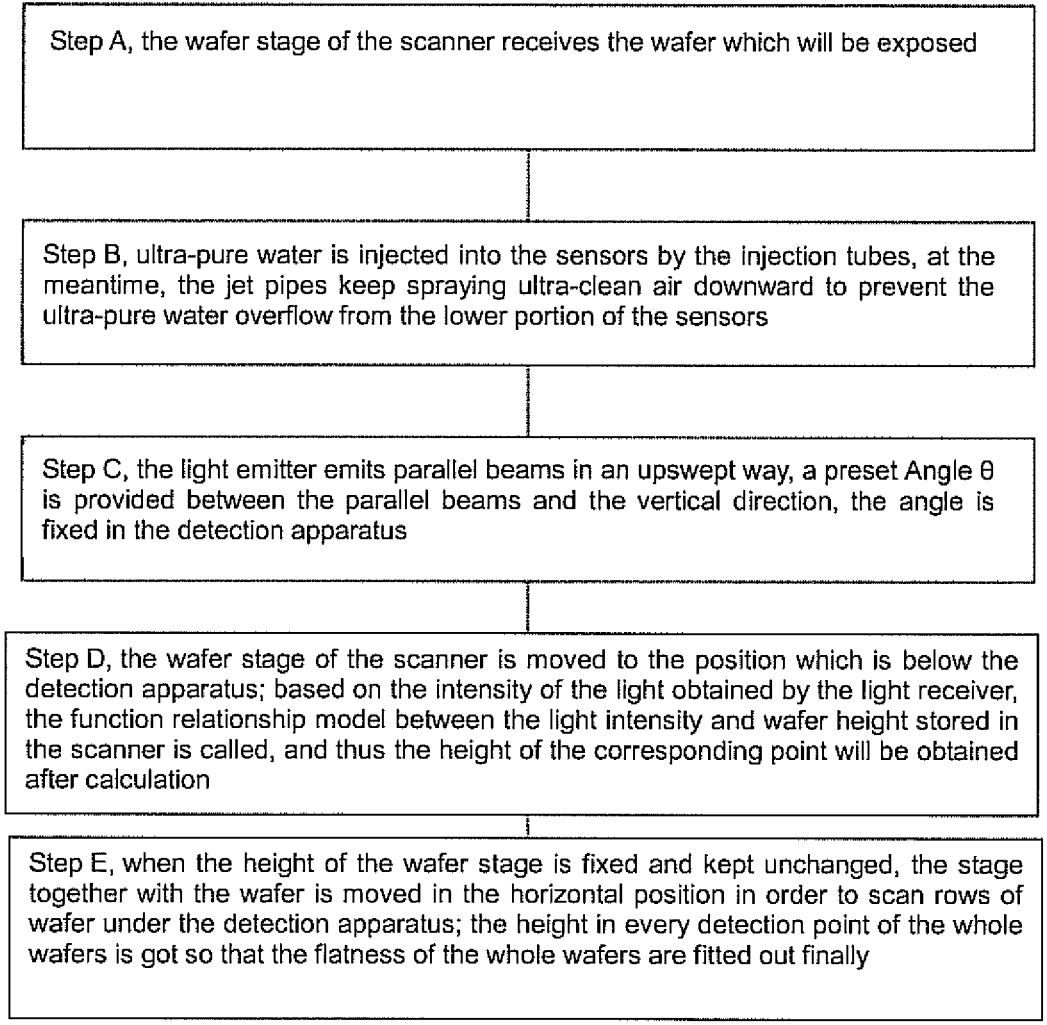
FIG. 6 is an overall flow chart for detecting the flatness of a wafer according to an embodiment of the present invention.

As shown in FIG. 6, an embodiment of the present invention provides a method of detecting the flatness of a wafer with water using the scanner with the apparatus which is shown in FIGS. 1-3. The method comprises the following steps:

Step A, the wafer stage of the scanner receives the wafer that will be exposed;

Step B, ultra-pure water is injected into the detector elements 11 by the injection pipes 13, while the jet pipes keep spraying ultra-clean air downward to prevent the ultra-pure water from overflow from the lower portions of the detector elements;

Step C, the light emitter emits parallel beams along an upward-oblique direction, a preset Angle θ is provided between the parallel beams and the vertical direction, the angle is fixed in the detection apparatus;

Step D, the wafer stage of the scanner is moved to the position below the detection apparatus. Based on the intensity of the light obtained by the light receiver, the functional relationship model between the light intensity and wafer height is determined and stored in the scanner, thus the height of the corresponding scanned point will be obtained after calculation;

Step E, when the height of the wafer stage is fixed and kept unchanged, the stage together with the wafer is moved in horizontal direction in order to scan rows of the wafer under the detection apparatus. The height in every detected point of the entire wafer is established so that the flatness of the entire wafer is finally obtained.

One-row of detector elements 11 aligned along a transverse direction can be moved longitudinally in the flatness detecting step to scan the entire upper surface of the wafer to be measured.

The above mentioned embodiments are only the preferred examples for the present invention, they should not be deemed as limitations on the scope of this invention. A variety of modifications that do not depart from the scope and spirit of the invention will be evident to these skilled in the art from the foregoing disclosure. The following claims are intended to cover the specific embodiments set forth herein as well as modifications, variations, and equivalents of those embodiments that come with the scope of the claims.

The invention claimed is:

1. An apparatus for detecting the flatness of wafer, wherein the apparatus comprises a plurality of detector elements, a metal sink and a plurality of injection pipes, the detector elements arranged side by side together make up a one-row detector elements; there is a preset distance between each two adjacent detector elements is fixed on the corresponding metal sink, and an upside of each of the detector elements is provided with one of the corresponding injection pipes wherein the injection pipe injects liquid into the inside of the detector element underlying this injection pipe; each of the detector element is used for detecting a height of a corresponding detection point on the wafer; the detector element comprises a metal tube body; a lower peripheral portion of the metal tube body is arranged with an array of jet pipes; the jet pipes are used to spray ultra-clean air downward; a light emitter is disposed on a side wall inside the metal tube body, a light receiver is disposed on the other side wall opposite to the side wall having the light emitter, the light receiver is located higher than the light emitter.

2. The apparatus according to claim 1, wherein the shape of the cross section of the metal tube body is square, rectangular or circular; the shape of the cross section of the jet pipe is square, rectangular or circular.

3. The apparatus according to claim 1, wherein the light emitter emitting parallel beams along an upward-oblique direction, an preset Angle θ is formed between the parallel beams and the vertical direction; the position and size of the light receiver are set as to receive all the parallel beams emitted from the light emitter completely when there is no liquid inside the detector elements.

4. The apparatus according to claim 3, wherein the Angle θ satisfies the following relationship:

$$\sin\theta > N_1/N_2$$

wherein, the sin θ is the sine value of the Angle θ, N1 is the refractive index of the parallel beams in the air, N2 is the refractive index of the parallel beams in the liquid.

5. The apparatus according to claim 1, wherein a lower portion of the light emitter is immersed in liquid and a high portion of the light emitter is exposed from the liquid so that the emitted beams from the high portion of the light emitter will shoot onto the light receiver but the emitted beams from the lower portion of the light emitter will be reflected by the liquid surface and can not be received by the light receiver.

6. The apparatus according to claim 5, wherein the liquid is ultra-pure water.

7. The apparatus according to claim 5, wherein about a half of the light emitter is exposed out of the liquid surface and another half of the light emitter is inserted in the liquid.

8. A method for detecting the flatness of wafer, which is applied in a scanner for detecting the flatness of the wafer, ultra-pure water is adopted as the liquid inside the detector elements, wherein the above apparatus according to claim 1 is applied, the apparatus is mounted on the scanner, the method comprises the following steps:

Step A, a preset amount of ultra-pure water is injected into the detector elements by the injection pipes, the amount of the injected ultra-pure water is preset and fixed when the detection is conducted by the same detector element each time; the jet pipes keep spraying ultra-clean air downward to prevent the ultra-pure water overflow from the lower portion of the metal tube body;

Step B, parallel beams are emitted by the light emitter along an upward-oblique direction, a preset Angle θ is formed between the parallel beams and a vertical direction, the light receiver completely receives all the parallel beams above the water surface;

Step C, according to an intensity of the parallel beam received from the light receiver, the height of each detecting point on the wafer is calculated by a preset method;

Step D, all heights detected by the detector elements are integrated so that the height of each point on the whole piece of the wafer is obtained, thus the flatness of the whole piece of wafers is measured finally.

9. A method according to claim 8, wherein, in Step A, the preset amount denotes the amount of water which can lead the water surface of the ultra-pure water to locate in a place that is close to the center of the vertical direction of the light emitter.

10. A method according to claim 8, wherein, in Step C, the preset method comprises:

Step 1, a testing wafer is placed on the wafer stage of the scanner; the testing wafer is a new ultra-flat silicon wafer without being deposited with any film stack;

Step 2, the intensity of the light received by the light receiver of every detector element corresponding to the every point on the wafer with different height is detected; and a function relationship is established between the height of each point of the wafer and the intensity of the corresponding light; the function relationship is saved in the scanner as a specific relational model of the scanner;

Step 3, in Step C, according to the intensities of the parallel beams received from the light receiver, the heights of the detecting points of the wafer corresponding to the intensities of the received beams are calculated by the relational model described in Step 2.

\* \* \* \* \*